(No Model.)
L. S. GARDNER, G. COOK & A. O. TANNENBERG.
COTTON BAND CUTTER.
No. 529,258. Patented Nov. 13, 1894.
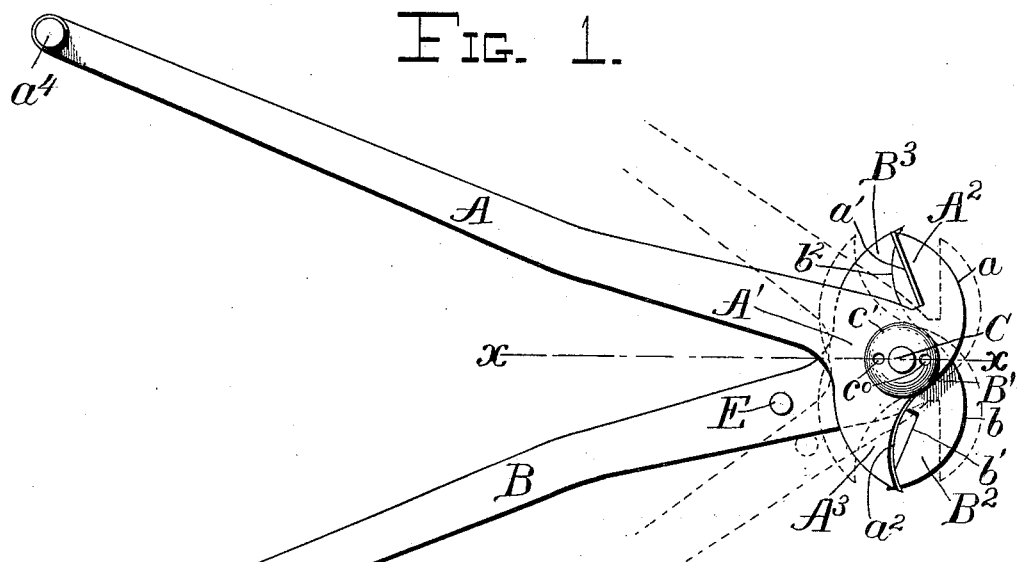
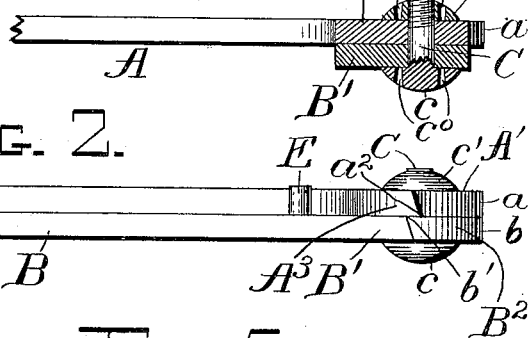
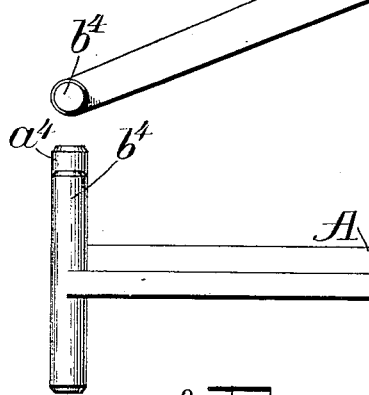
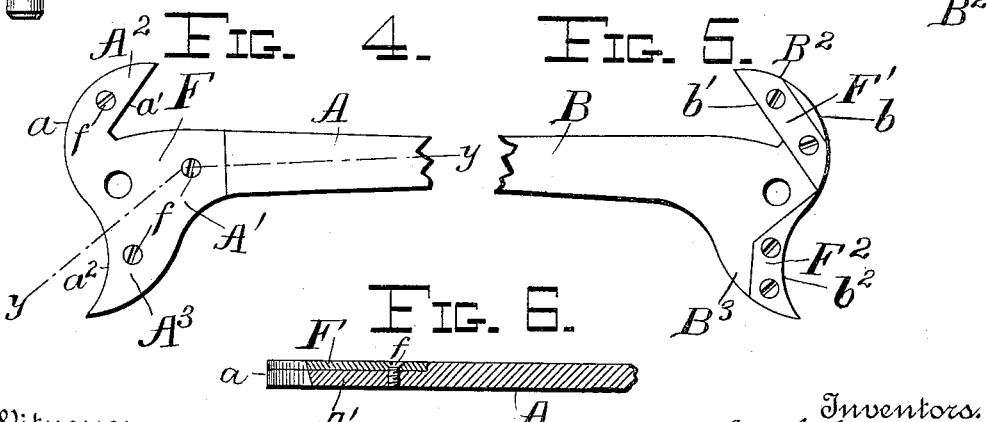
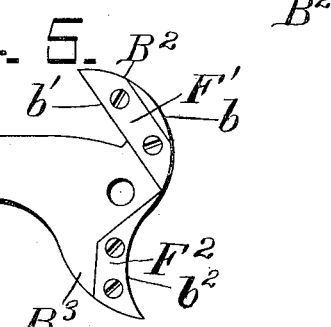
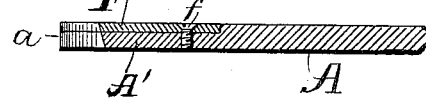
Witnesses
Percy C. Bowen
J. C. Wilson
Inventors.
Levi S. Gardner,
Gustave Cook,
August O. Tannenberg
By Whitman & Wilkinson,
Attorneys.

UNITED STATES PATENT OFFICE.

LEVI S. GARDNER, GUSTAVE COOK, AND AUGUST O. TANNENBERG, OF NEW ORLEANS, LOUISIANA, ASSIGNORS TO WILLIAM H. BOFINGER, OF SAME PLACE.

COTTON-BAND CUTTER.

SPECIFICATION forming part of Letters Patent No. 529,258, dated November 13, 1894.

Application filed August 16, 1894. Serial No. 520,475. (No model.)

*To all whom it may concern:*

Be it known that we, LEVI S. GARDNER, GUSTAVE COOK, and AUGUST O. TANNENBERG, citizens of the United States, residing at New Orleans, in the parish of Orleans, and State of Louisiana, have invented certain new and useful Improvements in Cotton-Band Cutters; and we do hereby declare the following to be a full, clear, and exact description of the invention, such as will enable others skilled in the art to which it appertains to make and use the same.

Our invention relates to improvements in cutters or shears for cutting the bands on bales of cotton, hay, or other material, and it consists of certain novel features hereinafter described and claimed.

Reference is had to the accompanying drawings, wherein the same parts are indicated by the same letters.

Figure 1 represents a plan view of a pair of cutters or shears constructed in accordance with our invention, showing the same partly open. Fig. 2 represents a side view of the same. Fig. 3 represents a sectional view on the line $x\ x$ of Fig. 1. Fig. 4 represents a view of a slightly modified form of the inner side of one of the blades showing a method of securing thereto detachable steel cutting edges. Fig. 5 represents a similar view showing a slight modification of the same. Fig. 6 represents a sectional view taken on the line $y\ y$ of Fig. 4.

Referring now more particularly to Figs. 1 to 3, A and B designate the two members of the cutters which are provided with the heads A' and B' and pivoted together by the bolt C passing through the said heads. Each of the members A and B has formed on one side of the head thereof a hook $A^2$ and $B^2$ respectively, the outside of which hooks are curved over as at $a$ and $b$, the inner edges of the hooks being straight and shaped to form cutting edges $a'$ and $b'$, which are at an angle of about forty-five degrees with their respective members A and B. On the sides of the heads opposite to the hooks $A^2$ and $B^2$ are formed extensions $A^3$ and $B^3$ the outer edges of which are curved inwardly and shaped to form cutting edges as at $a^2\ b^2$, the curve of the said cutting edges merging into, and forming compound curves with the outer curves $a$ and $b$ of the hooks.

When the two members A and B are turned about their pivotal point C, (as in the act of cutting with shears,) the straight cutting edges $a'$ and $b'$ pass across the curved cutting edges $a^2$ and $b^2$ coming together first at the points (as shown in Fig. 1), and closing toward the base of the hooks. Thus it will be seen that a band, cord, or wire, being once caught between the cutting edges there would be no chance of its slipping out, but on the contrary it would be forced in toward the base of the hooks where it would eventually be severed when the cutting edges closed altogether.

In operation the two members are opened as shown in dotted lines in Fig. 1, and one of the hooks $A^2$ or $B^2$ is hooked beneath the band on the bale of cotton, hay, or other material. The closing of the members will then cut the band as will be readily understood.

By having a pair of cutters on each side of the tool it may be hooked under either side of a band without turning it in the hand, or it may be hooked under two adjacent bands at the same time, and cut both at once.

The members A and B are made long enough to obtain sufficient leverage for the work in hand, and terminate in handles $a^4$ and $b^4$, which, though shown as cross pieces, may be of any other suitable form. The movement of the members is limited by a stop E secured to one of the members as B, against which the other member will strike when the blades are closed, and against which the extension $A^3$ will strike when the blades are opened sufficiently wide. The cutting edge $a'\ b'$ and $a^2\ b^2$ should be made of hard steel, but the other part of the members may be of a good quality of malleable iron. To facilitate the tempering, sharpening, or repairing of these cutting edges or blades, we prefer to make them of a separate piece of steel as shown at F in Figs. 4 and 6 or of two pieces F' and $F^2$ as shown in Fig. 5. These blades are set into the members as shown in Fig. 6, and may be secured by means of screws $f$ or in any other suitable way. The head c and the nut c' of the bolt are formed round and smooth to prevent them from catching in the bale, and are provided with holes $c^\circ$ in which an instrument may be placed to turn the said bolt or nut.

By the construction hereinbefore described it will be seen that we produce a tool for cutting bands, wire, and other such articles, which is very simple in construction, strong and durable, and very efficient for the purposes set forth.

Having thus described our invention, what we claim, and desire to secure by Letters Patent of the United States, is—

1. In a tool of the character described, the combination of two members pivoted together and each having a hook provided with a straight cutting edge, and an extension provided with a curved cutting edge, on opposite sides of said pivot and oppositely disposed so that the curved cutting edge of the one member will close across the straight cutting edge of the other member, substantially as and for the purposes described.

2. In a tool of the character described, the combination of two members pivoted together and each having a hook on one side and an extension on the other side, of said pivot; cutting edges detachably secured to said hooks and extensions, and oppositely disposed so that the cutting edges of the one member will close across the cutting edges of the other member substantially as and for the purposes described.

3. In a tool of the character described, the combination of two members pivoted together and each having a hook with a straight inner edge, and an extension with a curved outer edge on opposite sides of said pivot; detachable blades having straight cutting edges for the inner edges of the hooks, and curved cutting edges for the curved outer edges of the extensions, the said members being oppositely disposed so that the curved cutting edge of one will close over the straight cutting edge of the other, from the points toward the base, and a stop attached to one of said members and adapted to limit the movement of the other of said members, substantially as and for the purposes described.

In testimony whereof we affix our signatures in presence of two witnesses.

LEVI S. GARDNER.
GUSTAVE COOK.
AUGUST O. TANNENBERG.

Witnesses:
WILLIAM H. BOFINGER,
DAVID LEMLEY.